US008658325B2

(12) United States Patent
Saeki (10) Patent No.: US 8,658,325 B2
(45) Date of Patent: Feb. 25, 2014

(54) METHOD OF CONTROLLING FUEL CELL VEHICLE AND FUEL CELL SYSTEM

(75) Inventor: Hibiki Saeki, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 586 days.

(21) Appl. No.: 12/829,496

(22) Filed: Jul. 2, 2010

(65) Prior Publication Data
US 2011/0003223 A1 Jan. 6, 2011

(30) Foreign Application Priority Data

Jul. 2, 2009 (JP) .................................. 2009-158053

(51) Int. Cl.
*H01M 8/04* (2006.01)
(52) U.S. Cl.
USPC .......................................... 429/432; 429/431
(58) Field of Classification Search
CPC .................................................. H01M 8/04395
USPC .................................................. 429/431, 432
See application file for complete search history.

(56) References Cited

U.S. PATENT DOCUMENTS

| | | | | |
|---|---|---|---|---|
| 5,646,852 | A * | 7/1997 | Lorenz et al. | 429/430 |
| 2005/0053814 | A1 * | 3/2005 | Imamura et al. | 429/22 |
| 2006/0021812 | A1 | 2/2006 | Saeki et al. | |
| 2006/0102397 | A1 | 5/2006 | Buck et al. | |
| 2008/0182144 | A1 | 7/2008 | Saeki et al. | |
| 2009/0098427 | A1 * | 4/2009 | Reiser | 429/23 |
| 2010/0055521 | A1 | 3/2010 | Umayahara et al. | |

FOREIGN PATENT DOCUMENTS

| | | |
|---|---|---|
| DE | 10233821 A1 | 2/2004 |
| EP | 1953857 A1 | 8/2008 |
| EP | 2006946 A1 | 12/2008 |
| JP | 2002-352826 | 12/2002 |
| JP | 2004-342475 | 12/2004 |
| JP | 2007-149496 | 6/2007 |
| JP | 2008-186655 | 8/2008 |
| JP | 2008-218398 | 9/2008 |
| JP | 2009-32418 | 2/2009 |

OTHER PUBLICATIONS

European Office Action for Application No. 10168207.8, dated Sep. 2, 2010.
Japanese Office Action for Application No. 2009-158053, dated Apr. 19, 2011.

* cited by examiner

*Primary Examiner* — Yogendra Gupta
*Assistant Examiner* — Alison Hindenlang
(74) *Attorney, Agent, or Firm* — Nelson Mullins Riley & Scarborough LLP; Anthony A. Laurentano (57) ABSTRACT

A fuel cell vehicle is controlled by performing a rate limiting control process for reducing electric power generated by a fuel cell to reduce a frequency at which a voltage generated by the fuel cell is equal to or higher than a predetermined voltage when electric power requested by a load is lowered, and changing a rotational speed of an air pump depending on the electric power requested by the load when the electric power generated by the fuel cell is reduced.

9 Claims, 9 Drawing Sheets

----- FIRST COMPARATIVE EXAMPLE
—·— SECOND COMPARATIVE EXAMPLE

FIG. 9

METHOD OF CONTROLLING FUEL CELL VEHICLE AND FUEL CELL SYSTEM

CROSS-REFERENCE TO RELATED APPLICATION

This application is based upon and claims the benefit of priority from Japanese Patent Application No. 2009-158053 filed on Jul. 2, 2009, of which the contents are incorporated herein by reference.

BACKGROUND OF THE INVENTION

1. Field of the Invention

The present invention relates to a method of controlling a fuel cell vehicle and a fuel cell system, each having a load energizable by electric power that is generated by a fuel cell from hydrogen supplied from a hydrogen storage device and an oxygen-containing gas supplied from an air pump, and more particularly to a method of controlling a fuel cell vehicle and a fuel cell system of the type described above to prevent the fuel cell from being deteriorated and also to prevent the user from feeling uncomfortable about the output sound generated by the air pump when electric power demanded by the load drops in level.

2. Description of the Related Art

In recent years, intensive efforts have been made to carry out research and development on fuel cells. A fuel cell generates electric power when anodes thereof are supplied with hydrogen and cathodes thereof are supplied with an oxygen-containing gas. It is known in the art that the hydrogen is supplied to the anodes from a hydrogen storage device which stores hydrogen under high pressure and the oxygen-containing gas is supplied to the cathodes from an air pump or an air compressor (see, for example, Japanese Laid-Open Patent Publication No. 2007-149496 and Japanese Laid-Open Patent Publication No. 2002-352826).

According to Japanese Laid-Open Patent Publication No. 2007-149496, the flow rate of the oxygen-containing gas is regulated by an air compressor (36), and the flow rate of the fuel gas is regulated depending on the pressure of the oxygen-containing gas (see, for example, paragraphs [0014], [0016] of the publication). The flow rates of the oxygen-containing gas and the fuel gas are similarly regulated according to Japanese Laid-Open Patent Publication No. 2002-352826 (see, for example, paragraphs [0013], [0017] of the publication). According to Japanese Laid-Open Patent Publication No. 2002-352826, furthermore, a target generated current (IFC) for a fuel cell (11) is calculated depending on an accelerator opening (AC), and a target flow rate (QM) and a target pressure (PM) for a reaction gas are calculated depending on the target generated current. In addition, a rotational speed (N) of an air compressor (21) is calculated based on the target generated current for controlling the air compressor (see, for example, FIG. 2, and paragraphs [0031], [0033] of the publication).

It is also known in the art that fuel cells are used as vehicle power sources (see, for example, U.S. Patent Application Publication No. 2006/0021812 and Japanese Laid-Open Patent Publication No. 2009-032418). According to U.S. Patent Application Publication No. 2006/0021812, electric power is supplied from one or both of a fuel cell and a battery to a traction motor to energize the traction motor (see, for example, paragraph [0040] of the publication). According to Japanese Laid-Open Patent Publication No. 2009-032418, for the purpose of preventing a fuel cell from being deteriorated, the rate of change of a cell voltage is controlled so as to be equal to or lower than a predetermined value when the load on the fuel cell changes from a high level to a low level (see, for example, the abstract of the publication).

If the control process disclosed in Japanese Laid-Open Patent Publication No. 2009-032418 is applied to the fuel cell control apparatus disclosed in Japanese Laid-Open Patent Publication No. 2002-352826 which determines the rotational speed of the air pump depending on the accelerator opening, i.e., the magnitude of the load, then the user may possibly find the output sound generated by the air pump uncomfortable though the fuel cell itself is prevented from being deteriorated.

More specifically, according to the control process disclosed in Japanese Laid-Open Patent Publication No. 2009-032418, since the rate of change of the cell voltage is reduced to a predetermined value or lower, the rate of change of a cell current is also reduced due to the current-voltage characteristics of the fuel cell. As a result, the electric power generated by the fuel cell drops at a rate which is lower than the rate at which the electric power demanded by the load in response to the accelerator opening drops. In the control process disclosed in Japanese Laid-Open Patent Publication No. 2009-032418, if the rotational speed of the air pump is related to the electric power generated by the fuel cell, then even when the electric power demanded by the load is lowered, the rotational speed of the air pump is not reduced correspondingly, and the output sound generated by the air pump may possibly make the user feel uncomfortable.

SUMMARY OF THE INVENTION

It is an object of the present invention to provide a method of controlling a fuel cell vehicle and a fuel cell system to prevent a fuel cell from being deteriorated and also to prevent the user from feeling uncomfortable about the output sound generated by an air pump.

According to the present invention, there is provided a method of controlling a fuel cell vehicle having a load energizable by electric power generated by a fuel cell from hydrogen supplied from a hydrogen storage device and an oxygen-containing gas supplied from an air pump, comprising the steps of performing a rate limiting control process for reducing the electric power generated by the fuel cell to reduce a frequency at which a voltage generated by the fuel cell is equal to or higher than a predetermined voltage when electric power requested by the load is lowered, and changing a rotational speed of the air pump depending on the electric power requested by the load when the electric power generated by the fuel cell is reduced.

When the electric power requested by the load is lowered, the fuel cell is prevented from being deteriorated by the rate limiting control process, and the user of the fuel cell vehicle is prevented from feeling uncomfortable about the output sound of the air pump during the rate limiting control process.

Specifically, in the rate limiting control process, since an increase of the voltage generated by the fuel cell is limited, the electric power generated by the fuel cell is more slowly reduced than the electric power requested by the load is lowered, thereby preventing the fuel cell from being deteriorated. In the rate limiting control process, if the rotational speed of the air pump is associated with the electric power generated by the fuel cell, then even when the electric power requested by the load is lowered, the rotational speed of the air pump is not reduced significantly, tending to make the user feel uncomfortable about the output sound of the air pump. According to the present invention, in the rate limiting control process, since the rotational speed of the air pump is associated with the electric power requested by the load, when the electric power requested by the load is reduced, the rotational speed of the air pump is lowered accordingly. Therefore, the user is prevented from feeling uncomfortable about the output sound of the air pump.

In the above method, an electric energy storage may be charged with excessive electric power produced by the fuel cell in the rate limiting control process. The electric energy storage is thus prevented from being deteriorated when it is charged in the rate limiting control process.

Specifically, in the rate limiting control process, if the rotational speed of the air pump is associated with the electric power generated by the fuel cell, then even when the electric power requested by the load is lowered, the rotational speed of the air pump is not reduced significantly, but the fuel cell is supplied with an amount of oxygen-containing gas (and an amount of hydrogen with a certain arrangement) which is (are) greater than those corresponding to the electric power requested by the load. At this time, the electric power generated by the fuel cell exceeds the electric power requested by the load, and the electric energy storage is quickly charged with excessive electric power. Thus, the electric energy storage tends to be unduly deteriorated.

According to the present invention, in the rate limiting control process, the rotational speed of the air pump is associated with the electric power requested by the load. Therefore, when the electric power requested by the load is lowered, the rotational speed of the air pump is also lowered accordingly. The fuel cell is thus supplied with only an amount of oxygen-containing gas (and an amount of hydrogen with a certain arrangement) which corresponds to the electric power requested by the load. As excessive electric power produced by the fuel cell in the rate limiting control process is reduced, the electric energy storage is prevented from being deteriorated due to quick charging with excessive electric power.

An increase in the voltage generated by the fuel cell may be limited in the rate limiting control process. An allowable reduction in an output of the fuel cell may be made smaller as the output of the fuel cell is smaller in the rate limiting control process. Alternatively, an allowable reduction in an output of the fuel cell may be made smaller as the fuel cell is more deteriorated in the rate limiting control process.

The fuel cell vehicle may include an electric energy storage connected to the load parallel to the fuel cell. The method may further comprise the steps of setting a threshold value for determining whether the electric energy storage is excessively charged or not, and performing the rate limiting control process when a remaining charged level of the electric energy storage is equal to or smaller than the threshold value.

The rate limiting control process may be performed when a cell voltage of the fuel cell is normal. Alternatively, the rate limiting control process may be performed when a current generated by the fuel cell is reduced.

In the rate limiting control process, a requested current to be generated by the fuel cell may be set based on the electric power requested by the load and a current generated by the fuel cell may be controlled using a target generated current which limits the requested current to be generated by the fuel cell to prevent the voltage generated by the fuel cell from becoming equal to or higher than a predetermined voltage, and the rotational speed of the air pump may be controlled based on the requested current to be generated by the fuel cell when the rate limiting control process is performed. Since the rotational speed of the air pump is controlled based on the requested current to be generated by the fuel cell rather than the target generated current. Therefore, the rate limiting control process does not affect the output of the air pump, and hence the output sound of the air pump is appropriately controlled.

The load may include a traction motor for propelling the fuel cell vehicle, and the fuel cell and the electric energy storage may be connected to the motor in parallel relationship to each other. The electric energy storage may include a DC/DC converter. An output of the fuel cell may be controlled by controlling the voltage generated by the fuel cell with the DC/DC converter.

In the rate limiting control process, a requested current to be generated by the fuel cell may be set based on the electric power requested by the load and controlling the DC/DC converter using, as a target value, a target generated current which limits the requested current to be generated by the fuel cell to prevent the voltage generated by the fuel cell from becoming equal to or higher than a predetermined voltage.

According to the present invention, there is also provided a method of controlling a fuel cell system having a load energizable by electric power generated by a fuel cell from hydrogen supplied from a hydrogen storage device and an oxygen-containing gas supplied from an air pump, comprising the steps of performing a voltage increase limiting control process to limit an increase in a voltage generated by the fuel cell when electric power requested by the load is lowered, and controlling an output of the air pump in relation to requested electric power to be generated by the fuel cell before the increase in the voltage generated by the fuel cell is limited, in the voltage increase limiting control process.

Even during the voltage increase limiting control process which limits an increase in the voltage generated by the fuel cell when electric power requested by the load is lowered, the output of the air pump is not affected by the voltage increase limiting control process, but is reduced as the electric power requested by the load is reduced. During the voltage increase limiting control process, therefore, the fuel cell is prevented by the voltage increase limiting control process from being deteriorated due to an increase in the generated voltage, and the user of the fuel cell system is prevented from feeling uncomfortable because of the output sound of the air pump which otherwise does not respond to the reduction in the electric power requested by the load.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

1. Description of the Overall Arrangement

[Overall Arrangement]

Figure 1:
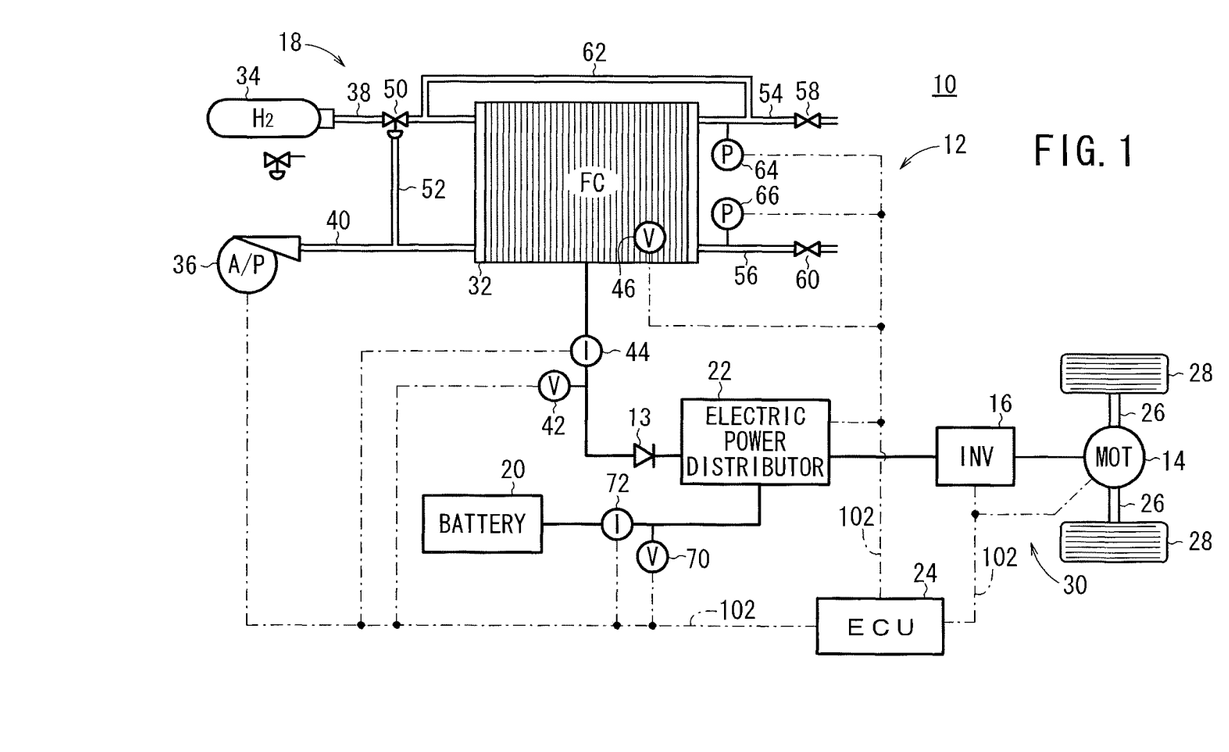
FIG. 1 is a block diagram of a fuel cell vehicle incorporating a fuel cell system which carries out a control method according to an embodiment of the present invention.

FIG. 1 is a block diagram of a fuel cell vehicle 10 (hereinafter also referred to as "FC vehicle 10") incorporating a fuel cell system 12 (hereinafter also referred to as "FC system 12") which carries out a control method according to an embodiment of the present invention.

The FC vehicle 10 includes a traction motor 14 and an inverter 16 in addition to the FC system 12. The FC system 12 comprises a fuel cell unit 18 (hereinafter also referred to as "FC unit 18") as a first power supply, a battery 20 as a second power supply, an electric power distributor 22, and an electronic control unit 24 (hereinafter also referred to as "ECU 24").

[Drive System]

The motor 14 generates propulsive drive power based on electric power supplied from the FC unit 18 and the battery 20, and supplies the drive power to cause a transmission 26 to rotate wheels 28. In a regenerative mode, the motor 14 generates and outputs electric power (regenerated electric power Preg) [W] to the battery 20. The regenerated electric power Preg may be output to accessories, not shown.

The inverter 16, which is of a three-phase full-bridge configuration, performs AC/DC conversions. Specifically, the inverter 16 converts a DC from the FC system 12 to a three-phase AC and supplies the three-phase AC to the motor 14, and also converts a three-phase AC generated by the motor 14 in the regenerative mode to a DC and supplies the DC through the electric power distributor 22 to the battery 20, charging the battery 20.

The motor 14 and the inverter 16 are collectively referred to as a load 30.

[FC Unit 18]

The FC unit 18 includes a fuel cell 32 (hereinafter also referred to as "FC 32") which is of a stacked structure formed by stacking cells each comprising an anode, a cathode, and a solid polymer electrolyte membrane sandwiched between the anode and the cathode. The FC 32 is connected to a hydrogen tank 34 and an air pump 36 by respective passages 38, 40 that are connected to respective inlet ports of the FC 32. The hydrogen tank 34 supplies hydrogen (fuel gas) as one reaction gas to the FC 32, and the air pump 36 supplies compressed air (oxygen-containing gas) as another reaction gas to the FC 32. The hydrogen supplied from the hydrogen tank 34 to the FC 32 and the air supplied from the air pump 36 to the FC 32 cause an electrochemical reaction in the FC 32, generating electric power (FC electric power Pfc) [W] which is supplied through a diode 13 to the motor 14 and the battery 20. The voltage [V] generated by the FC 32 (hereinafter also referred to as "FC voltage Vfc") is detected by a voltage sensor 42, and the current [A] generated by the FC 32 (hereinafter also referred to as "FC current Ifc") is detected by a current sensor 44. The detected voltage and current values are output to the ECU 24. The voltage [V] generated by each of the cells of the FC 32 (hereinafter also referred to as "cell voltage Vcell") is detected by a voltage sensor 46 and output to the ECU 24.

A normally closed regulator 50 is connected to the passage 38 which interconnects the hydrogen tank 34 and the FC 32. To the normally closed regulator 50, there is connected a passage 52 branched from the passage 40 which interconnects the air pump 36 and the FC 32. Therefore, the normally closed regulator 50 is supplied with the compressed air from the air pump 36. The normally closed regulator 50 serves to change the opening degree of its own valve to regulate the flow rate of the hydrogen supplied from the hydrogen tank 34 to the FC 32 depending on the pressure of the compressed air that is supplied to the normally closed regulator 50.

The FC 32 has outlet ports connected respectively to an outlet passage 54 for discharging hydrogen and an outlet passage 56 for discharging air. Back-pressure valves 58, 60 for regulating the pressure of the hydrogen discharged from the FC 32 and the pressure of the air discharged from the FC 32 are connected respectively to the outlet passages 54, 56. The passage 38 connected to the hydrogen inlet of the FC 32 is connected by a passage 62 to the passage 54 connected to the hydrogen outlet of the FC 32. The hydrogen discharged from the FC 32 into the passage 54 is returned through the passage 62 and the passage 38 to the hydrogen inlet of the FC 32. Pressure sensors 64, 66 are connected respectively to the outlet passages 54, 56. The pressure sensors 64, 66 detect the respective pressures of the hydrogen in the outlet passage 54 and the air in the outlet passage 56, and output the detected pressure values to the ECU 24.

The FC unit 18 may have structural details as disclosed Japanese Laid-Open Patent Publication No. 2007-149496 or Japanese Laid-Open Patent Publication No. 2002-352826, for example.

[Battery 20]

The battery 20 serves as an electric energy storage which may comprise a lithium ion secondary cell, a capacitor, or the like. In the present embodiment, the battery 20 comprises a lithium ion secondary cell. The battery 20 has an output voltage (hereinafter also referred to as "battery voltage Vbat") [V] detected by a voltage sensor 70 and an output current (hereinafter also referred to as "battery current Ibat") [A] detected by a current sensor 72. The voltage sensor 70 and the current sensor 72 output the detected voltage and current values to the ECU 24.

[Electric Power Distributor 22]

The electric power distributor 22 controls where the FC electric power Pfc from the FC unit 18, the electric power from the battery 20 (hereinafter also referred to as "battery electric power Pbat") [W], and the regenerated electric power Preg from the motor 14 are to be supplied.

Figure 2:
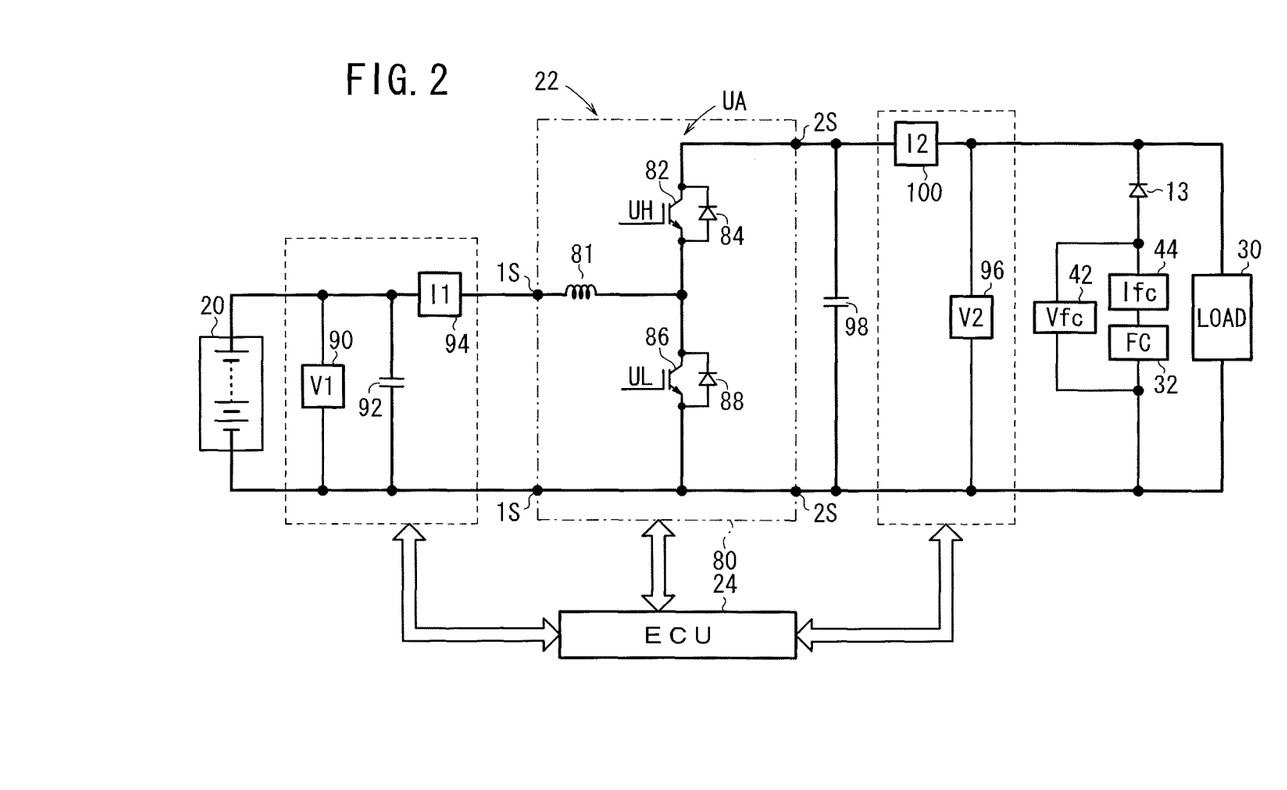
FIG. 2 is a circuit diagram, partly in block form, of a detailed circuit arrangement of a DC/DC converter which serves as an electric power distributor of the fuel cell system according to the embodiment.

FIG. 2 shows the electric power distributor 22 in detail according to the present embodiment. As shown in FIG. 2, the electric power distributor 22 comprises a DC/DC converter 80 having one side connected to primary terminals 1S to which the battery 20 is connected and the other side connected to secondary terminals 2S as a junction between the load 30 and the FC 32.

The DC/DC converter 80 comprises a buck-boost and chopper-type voltage converter for increasing a voltage [V] between the primary terminals 1S (primary voltage V1) to a voltage [V] between the secondary terminals 2S (secondary voltage V2) ($V1 \leq V2$) and reducing the secondary voltage V2 to the primary voltage V1.

As shown in FIG. 2, the DC/DC converter 80 comprises a phase arm UA connected between the primary terminals 1S and the secondary terminals 2S and a reactor 81.

The phase arm UA comprises upper arm devices including an upper arm switching element 82 and a diode 84 and lower arm devices including a lower arm switching element 86 and a diode 88.

The upper arm switching element 82 and the lower arm switching element 86 comprise MOSFETs, IGBTs, or the like, respectively.

The reactor 81 is inserted between a midpoint (common junction) of the phase arm UA and the positive terminal of the battery 20. The reactor 81 discharges and stores energy when the DC/DC converter 80 converts between the primary voltage V1 and the secondary voltage V2.

The upper arm switching element 82 is turned on by a high level of a gate drive signal (drive voltage) UH that is output from the ECU 24, and the lower arm switching element 86 is turned on by a high level of a gate drive signal (drive voltage) UL that is output from the ECU 24. The ECU 24 detects the primary voltage V1 with a voltage sensor 90 connected parallel to a smoothing capacitor 92 on the primary side, detects a primary current I1 to and from the battery 20 with a current sensor 94 connected to one of the primary terminals 1S, detects the secondary voltage V2 with a voltage sensor 96 connected parallel to a smoothing capacitor 98 on the secondary side, and detects a secondary current I2 from the FC 32 with a current sensor 100.

[ECU 24]

The ECU 24 controls the motor 14, the inverter 16, the FC unit 18, the battery 20, and the electric power distributor 22 through communication lines 102. To control them, the ECU 24 executes programs stored in a memory (ROM) thereof, using detected values from the various sensors including the voltage sensors 42, 46, 70, 90, 96, the current sensors 44, 72, 94, 100, the pressure sensors 64, 66, etc. The ECU 24 includes a microcomputer and, if necessary, has timers and input/output interfaces including A/D converters, D/A converters, etc. The ECU 24 may not comprise a single ECU, but may comprise a plurality of ECUs associated respectively with the motor 14, the FC unit 18, the battery 20, and the electric power distributor 22.

The ECU 24 determines a total demand load Lt on the FC vehicle 10 based on the state of the FC 32, the state of the battery 20, the state of the motor 14, and the input signals from the switches and the sensors (load demands). Then, the ECU 24 determines the allocations (shares) of a fuel cell allocated load (demand output) Lf to be allocated to the FC 32, a battery allocated load (demand output) Lb to be allocated to the battery 20, and a regenerative power supply allocated load (demand output) Lr to be allocated to the regenerative power supply (motor 14), through an arbitration process, based on the total demand load Lt, and sends commands indicative of the determined allocations to the motor 14, the inverter 16, the FC unit 18, the battery 20, and the electric power distributor 22.

2. Control Method According to the Present Embodiment

A control method for controlling the air pump 36 and the DC/DC converter 80 will be described below.

Figure 3:
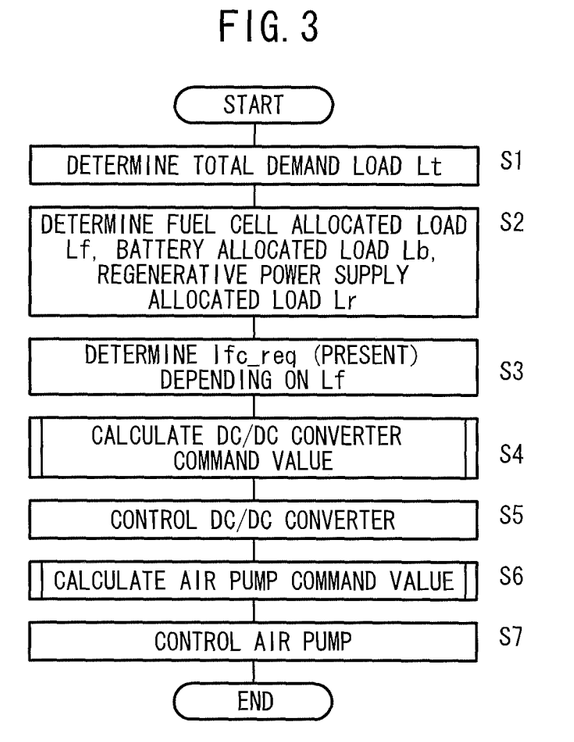
FIG. 3 is a flowchart of a basic control sequence of the DC/DC converter and an air pump.

FIG. 3 is a flowchart of a basic control sequence of the air pump 36 and the DC/DC converter 80 controlled by the ECU 24. For illustrative purposes, values calculated in a present cycle will be marked with "present" and values calculated in a previous cycle will be marked with "previous".

In step S1, the ECU 24 determines (calculates) a total demand load Lt from the power demand of the motor 14 and the power demand of the FC unit 18 (air pump, etc.), which all represent load demands. In step S2, the ECU 24 determines the allocations of a fuel cell allocated load Lf, a battery allocated load Lb, and a regenerative power supply allocated load Lr for outputting the determined total demand load Lt.

In step S3, the ECU 24 determines a requested generated current {requested FC current Ifc_req (present)} [A] for the FC 32 depending on the fuel cell allocated load Lf. Specifically, the output of the FC 32 is calculated based on the FC voltage Vfc and the FC current Ifc. Based on the I-V characteristics of the FC 32, combinations of values of the fuel cell allocated load Lf and the requested FC current Ifc_req are stored as a map in the memory, not shown, of the ECU 24. The ECU 24 reads the value of the requested FC current Ifc_req corresponding to the determined fuel cell allocated load Lf as a requested FC current Ifc_req (present) from the memory.

In step S4, the ECU 24 calculates a command value for the DC/DC converter 80 based on the requested FC current Ifc_req (present). The command value thus calculated represents a target value for the secondary voltage V2 (target secondary voltage V2_tar) [V].

In calculating the target secondary voltage V2_tar, according to the present embodiment, the following control process is carried out for the purpose of effectively utilizing the FC electric power Pfc while preventing the FC 32 from being deteriorated:

First, an output characteristic curve (hereinafter referred to as "output characteristic curve Cfc") of the FC 32 will be described below. The output characteristic curve Cfc of the FC 32 makes the FC output Pfc higher as the FC voltage Vfc is lower (see FIG. 4) as with the general fuel cell. According to the present embodiment, the DC/DC converter 80 controls the secondary voltage V2 to control the FC voltage Vfc of the FC 32 for thereby controlling the FC electric power Pfc of the FC 32.

Figure 4:
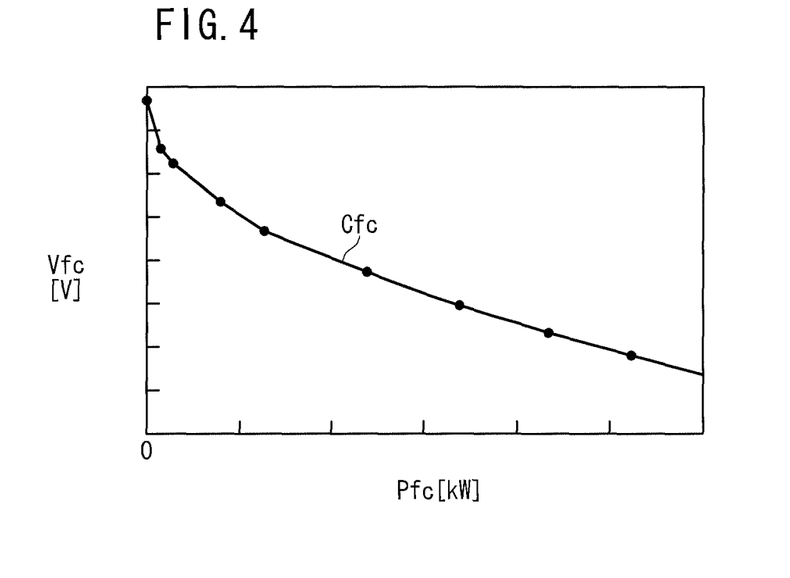
FIG. 4 is a diagram showing an output-voltage characteristic curve of a fuel cell mounted on the fuel cell vehicle.

As shown in FIG. 4, as the FC electric power Pfc becomes lower, the FC voltage Vfc changes greater when the FC current Ifc changes. As the FC voltage Vfc changes more, the FC 32 is deteriorated more.

According to the present embodiment, in view of the above feature, the change in the FC voltage Vfc per unit time (voltage change ΔVfc) [V/sec] is limited.

Figure 5:
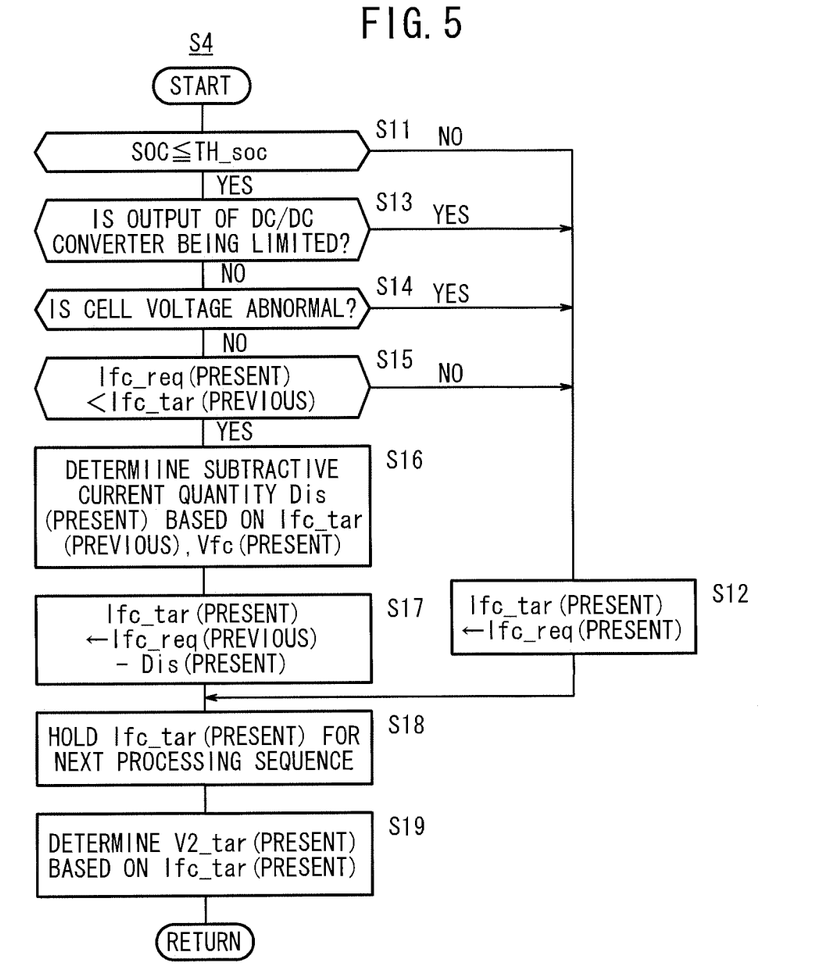
FIG. 5 is a flowchart of a processing sequence for calculating a command value for the DC/DC converter.

FIG. 5 is a flowchart of a processing sequence for calculating the target secondary voltage V2_tar. For illustrative purposes, as with FIG. 3, values calculated in a present cycle will be marked with "present" and values calculated in a previous cycle will be marked with "previous".

In step S11, the ECU 24 determines whether or not the state of charge SOC [%] of the battery 20 is equal to or smaller than a threshold value TH_soc based on the battery voltage Vbat detected by the voltage sensor 70. The threshold value TH_soc is a threshold value for the state of charge SOC used to determine whether the battery 20 is excessively charged or not. If the state of charge SOC is in excess of the threshold value TH_soc, then the battery 20 is judged as being excessively charged.

If the state of charge SOC is in excess of the threshold value TH_soc (S11: NO), then the battery 20 may possibly be unduly deteriorated by limiting a reduction in the output of the FC 32 and delivering the excessive output from the FC 32 to charge the battery 20. In step S12, therefore, the ECU 24 does not limit a reduction in the output of the FC 32, but sets the requested FC current Ifc_req (present) as a target value {target FC current Ifc_tar (present)} for the FC current Ifc. Then, control goes to step S18.

If the state of charge SOC is equal to or smaller than the threshold value TH_soc (S11: YES), then the battery 20 will not be unduly deteriorated by limiting a reduction in the output of the FC 32 and delivering the excessive output from the FC 32 to charge the battery 20.

In step S13, the ECU 24 confirms whether the output of the DC/DC converter 80 is being limited or not. The output of the DC/DC converter 80 may be limited when the DC/DC converter 80 is broken down or the upper arm switching element 82 is overheated. If the output of the DC/DC converter 80 is being limited (S13: YES), then limiting a reduction in the output of the FC 32 causes excessive electric power to be supplied from the FC 32 via the DC/DC converter 80 to the battery 20, with the result that the output from the DC/DC converter 80 increases. However, if the output of the DC/DC converter 80 is being limited, then a reduction in the output of the FC 32 cannot be limited. Accordingly, in step S12, the ECU 24 does not limit a reduction in the output of the FC 32, but sets the requested FC current Ifc_req (present) as a target FC current Ifc_tar (present).

If the output of the DC/DC converter 80 is not being limited (S13: NO), then the above problem does not arise by limiting a reduction in the output of the FC 32 and supplying the excessive output from the FC 32 via the DC/DC converter 80 to the battery 20. Therefore, control goes to step S14.

In step S14, the ECU 24 determines whether the cell voltage Vcell detected by the voltage sensor 46 is abnormal or not. When the cell voltage Vcell is abnormal, for example, it is of an abnormal value as a certain cell is not supplied with the fuel gas or the oxygen-containing gas for some reasons. In this case, since the FC 32 is likely to be damaged unless the FC current Ifc is quickly reduced, it is necessary to quickly reduce the FC current Ifc without limiting a reduction in the output of the FC 32.

If the cell voltage Vcell is abnormal (S14: YES), then, in step S12, the ECU 24 does not limit a reduction in the output of the FC 32, but sets the requested FC current Ifc_req (present) as a target FC current Ifc_tar (present). If the cell voltage Vcell is not abnormal (S14: NO), then the above problem does not arise by limiting a reduction in the output of the FC 32. Therefore, control goes to step S15.

In step S15, the ECU 24 determines whether the requested FC current Ifc_req (present) is smaller than a target FC current Ifc_tar (previous) or not. If the requested FC current Ifc_req (present) is not smaller than the target FC current Ifc_tar (previous) (S15: NO), then the FC 32 is not deteriorated by a reduction in the FC voltage Vfc, and there is hardly any need to limit a reduction in the output of the FC 32. In step S12, the ECU 24 does not limit a reduction in the output of the FC 32, but sets the requested FC current Ifc_req (present) as a target FC current Ifc_tar (present).

If the requested FC current Ifc_req (present) is smaller than the target FC current Ifc_tar (previous) (S15: YES), then the FC 32 may possibly be deteriorated by a reduction in the FC voltage Vfc, and it is necessary to limit a reduction in the output of the FC 32.

In step S16, the ECU 24 determines a subtractive current quantity Dis [A] based on the target FC current Ifc_tar (previous) and the FC voltage Vfc (present). The subtractive current quantity Dis represents a reduction in the FC current Ifc which is allowed in one process.

Figure 6:
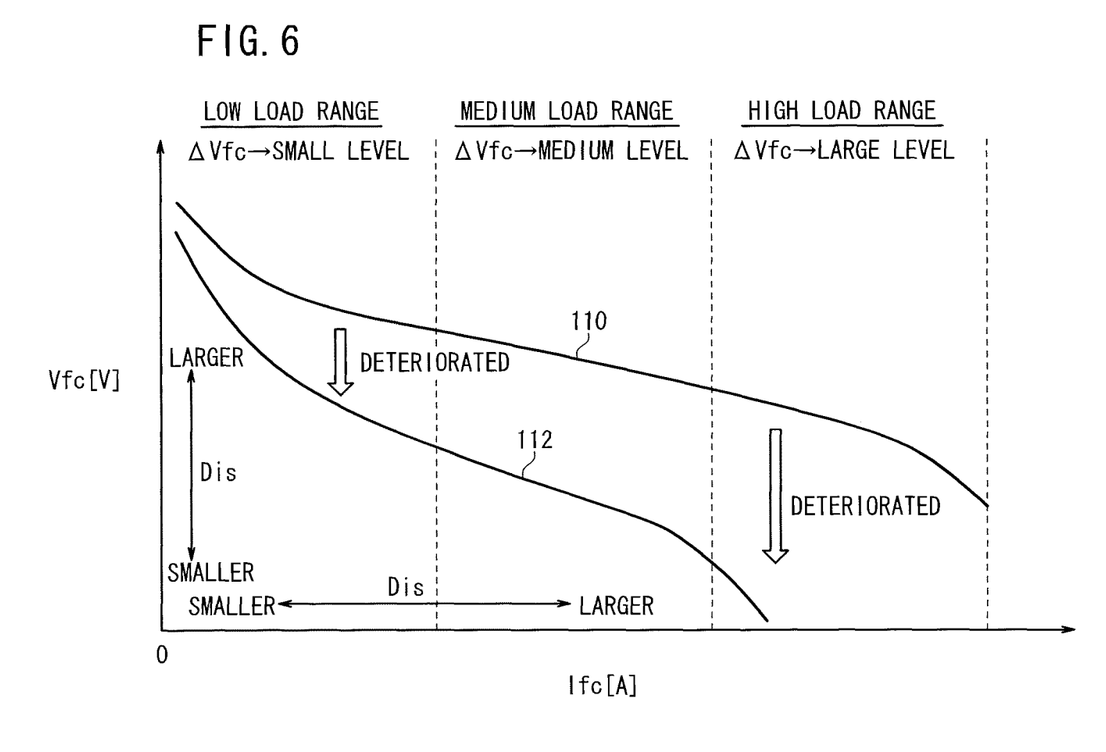
FIG. 6 is a diagram showing a process of determining a subtractive current quantity.

FIG. 6 is a diagram showing a process of determining the subtractive current quantity Dis. In FIG. 6, a curve 110 represents an I-V characteristic curve of the FC 32 before it is deteriorated, and a curve 112 represents an I-V characteristic curve of the FC 32 after it is deteriorated.

According to the present embodiment, as shown in FIG. 6, the FC current Ifc is divided into three ranges. In a range where the FC current Ifc is low (low load range), the change per unit time in the FC voltage Vfc (voltage change ΔVfc) is limited to a "small level". In a range where the FC current Ifc is medium (medium load range), the voltage change ΔVfc is limited to a "medium level". In a range where the FC current Ifc is high (high load range), the voltage change ΔVfc is limited to a "large level" (including no limitation on the voltage change ΔVfc). Since the FC 32 tends to be more deteriorated as the FC voltage Vfc is higher, the limitation thus imposed on the voltage change ΔVfc is able to prevent the FC 32 from being unduly deteriorated and to effectively utilize the output of the FC 32 in the high load range (and the medium load range).

As shown in FIG. 6, as the deterioration of the FC 32 goes on, the FC voltage Vfc is lowered even though the FC current Ifc remains the same, making steeper the gradient of the I-V characteristic curve in the low load range.

According to the present embodiment, based on the above tendency, the subtractive current quantity Dis depending on the target FC current Ifc_tar (previous) and the FC voltage Vfc (present) is stored as a map in order to make constant the limitation on the voltage change ΔVfc in the low and medium load ranges while taking into account changes in the I-V characteristic curve which are caused by the deterioration of the FC 32. The map representing the relationship between the target FC current Ifc_tar (previous), the FC voltage Vfc (present), and the subtractive current quantity Dis is stored in the non-illustrated memory of the ECU 24.

In order to make constant the limitation on the voltage change ΔVfc in the low and medium load ranges regardless of the deterioration of the FC 32, the map is arranged such that the subtractive current quantity Dis is smaller as the target FC current Ifc_tar (previous) is smaller and as the FC voltage Vfc (present) is lower (see FIG. 6). In FIG. 6, no specific numerical values of the map are illustrated.

As shown in FIG. 5, in step S17, the ECU 24 subtracts the subtractive current quantity Dis (present) from the target FC current Ifc_tar (previous), and sets the difference as the target FC current Ifc_tar (present).

In step S18, after step S12 or step S17, the ECU 24 holds the target FC current Ifc_tar (present) in the non-illustrated memory for a next processing sequence. In step S19, the ECU 24 determines a target secondary voltage V2_tar (present) based on the target FC current Ifc_tar (present). In calculating the target secondary voltage V2_tar, the ECU 24 brings the secondary voltage V2 (FC voltage Vfc) into conformity with the target secondary voltage V2_tar (target FC voltage Vfc_tar) also using a feedback control process such as a PID control process or the like.

As shown in FIG. 3, in step S5, the ECU 24 controls the DC/DC converter 80 to achieve the calculated target secondary voltage V2_tar (present). The DC/DC converter 80 then operates to increase or reduce the voltage.

In step S6, the ECU 24 calculates a command value for the air pump 36 based on the requested FC current Ifc_req (present) which has been determined in step S3. The command value represents a target value for the flow rate of air supplied from the air pump 36 (target air flow rate FR_tar).

Figure 7:
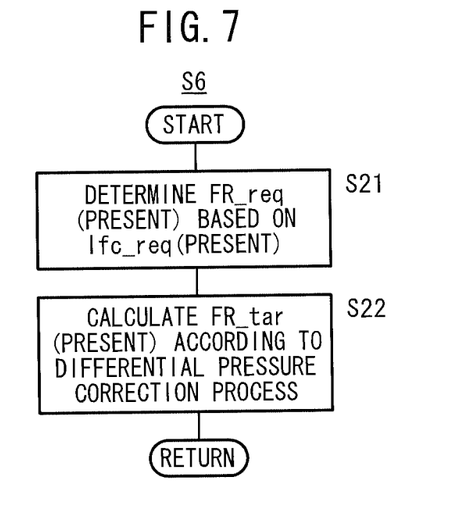
FIG. 7 is a flowchart of a processing sequence for calculating a command value for the air pump.

FIG. 7 is a flowchart of a processing sequence for calculating the target air flow rate FR_tar. For illustrative purposes, as with FIGS. 3 and 5, values calculated in a present cycle will be marked with "present" and values calculated in a previous cycle will be marked with "previous".

In step S21, the ECU 24 determines an air flow rate {requested air flow rate FR_req (present)} corresponding to the requested FC current Ifc_req (present). The non-illustrated memory of the ECU 24 stores a map representing the relationship between values of the requested FC current Ifc_req and the requested air flow rate FR_req. The ECU 24 identifies the requested air flow rate FR_req (present) from the map.

In step S22, the ECU 24 corrects the requested air flow rate FR_req (present) to calculate a target value for the air flow rate {target air flow rate FR_tar (present)} according to a differential pressure correction process. The differential pressure correction process is a process wherein if the differential pressure Dp between the pressure upstream of the anodes and the pressure downstream of the anodes is not equal to or higher than a differential pressure (differential pressure threshold TH_Dp) large enough to produce a flow speed for expelling distilled water out of the FC 32, the rotational speed N [rpm] of the air pump 36 is increased and the opening of the regulator 50 is increased to increase the pressure upstream of the anodes. If the differential pressure Dp is lower than the differential pressure threshold TH_Dp, therefore, the requested air flow rate FR_req (present) is increased depending on the pressure difference, thereby producing a target air flow rate FR_tar (present).

In step S7 shown in FIG. 3, the ECU 24 controls the air pump 36 to supply the compressed air at the calculated target air flow rate FR_tar (present).

3. Comparison with Comparative Examples

Operation of the present embodiment and operation of two comparative examples will be compared with each other. According to a first comparative example, the control process for limiting the voltage change ΔVfc (rate limiting control process) as described above with reference to FIG. 5 is not carried out, but the target secondary voltage v2_tar is determined based on the requested FC current Ifc_req, or in other words, the requested FC current Ifc_req is set directly as the target FC current Ifc_tar. According to the second comparative example, the output of the air pump 36, not the requested FC current Ifc_req, is controlled depending on the target FC current Ifc_tar in the above embodiment.

Figure 8:
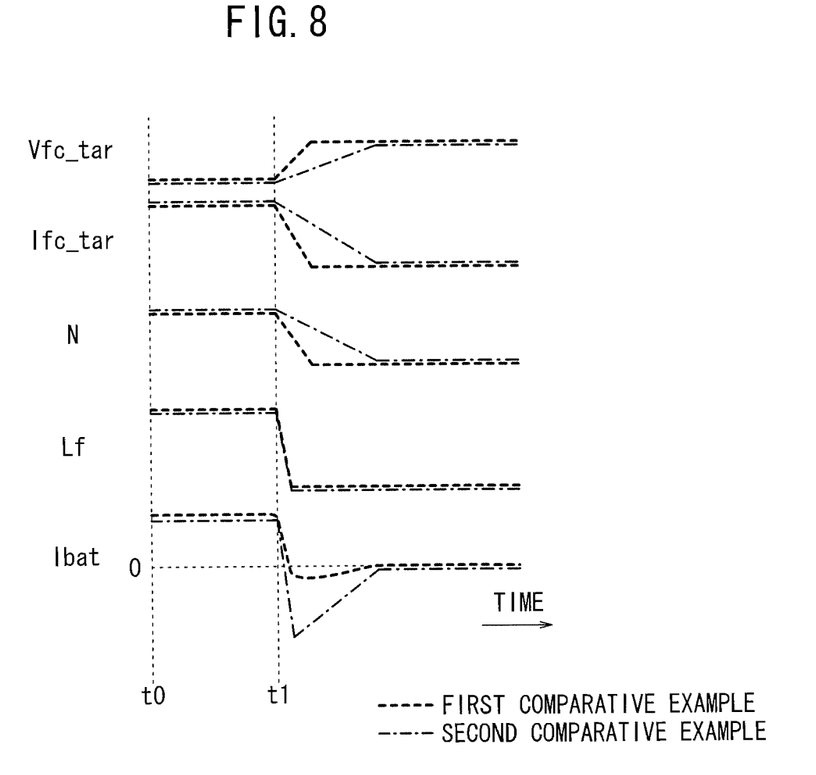
FIG. 8 is a diagram showing for comparison time-depending changes of various values according to a first comparative example and various values according to a second comparative example.

For illustrative purposes, the differences between the first comparative example and the second comparative example will be described below. FIG. 8 is a diagram showing for comparison time-depending changes of various values according to the first comparative example and various values according to the second comparative example. In FIG. 8, the first comparative example is represented by broken-line curves and the second comparative example by dot-and-dash-line curves.

From time t0 to time t1 in FIG. 8, the FC vehicle 10 is cruising at a constant speed and the motor 14 is under a constant load {the fuel cell allocated load Lf (hereinafter also referred to as "load quantity Lf")}. In both of the first comparative example and the second comparative example, the target FC voltage Vfc_tar, the target FC current Ifc_tar, the rotational speed N of the air pump 36, and the battery current Ibat are constant.

At time t1, the driver of the FC vehicle 10 returns the accelerator pedal, not shown, to its original position, for example, quickly reducing the load quantity Lf. According to the first comparative example, since the target FC voltage Vfc_tar is quickly increased and the target FC current Ifc_tar is quickly reduced, the rotational speed N of the air pump 36 is quickly reduced. As a result, the output of the FC 32 is also quickly reduced, thereby lowering the battery current Ibat nearly to the zero ampere.

According to the second comparative example, even when the load quantity Lf is quickly reduced at time t1, since the target FC voltage Vfc_tar is slowly increased and the target FC current Ifc_tar is slowly reduced, the FC 32 is prevented from being deteriorated. On the other hand, as the target FC voltage Vfc_tar is slowly increased and the target FC current Ifc_tar is slowly reduced at time t1, the rotational speed N of the air pump 36 is also slowly reduced. As a result, the output of the FC 32 is slowly lowered, so that the battery current Ibat greatly increases in a negative direction, i.e., with a polarity to charge the battery 20. Therefore, though the load quantity Lf is quickly reduced, the rotational speed N of the air pump 36 remains relatively high, making the output sound of the air pump 36 relatively large in level, which makes the user feel uncomfortable. In addition, since the battery current Ibat changes greatly, an unnecessary FC current Ifc is produced, resulting in a reduction in the fuel economy and further deteriorating the battery 20 due to an increase in the load imposed thereon.

Figure 9:
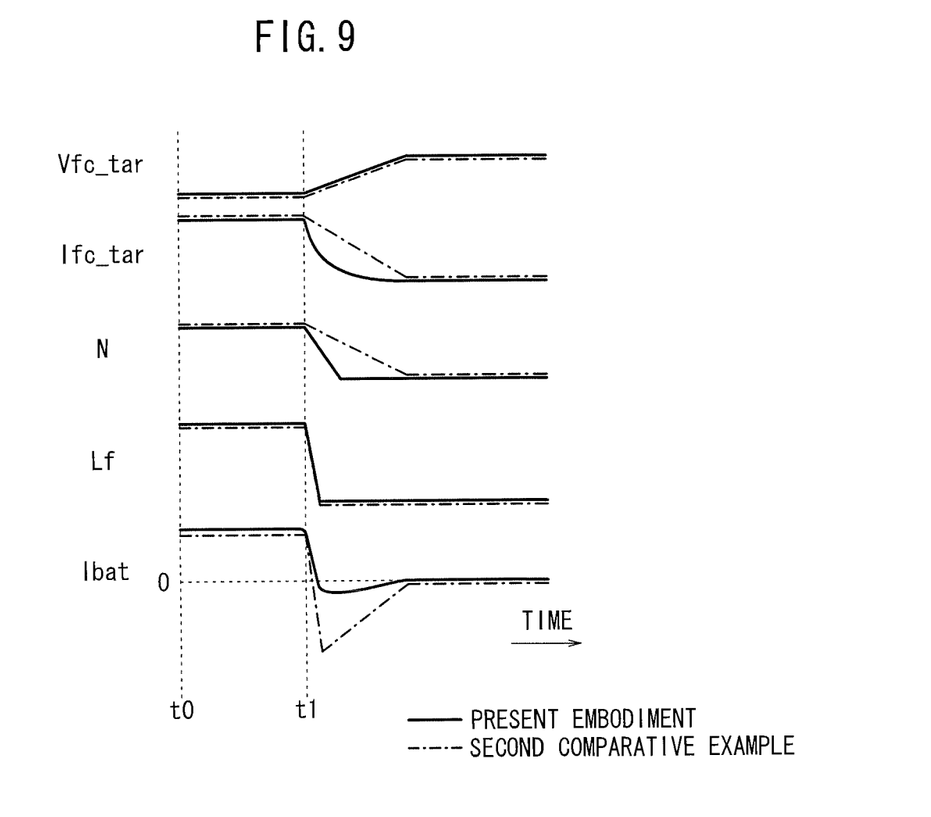
FIG. 9 is a diagram showing for comparison time-depending changes of various values according to the present embodiment and the various values according to the second comparative example.

The differences between the present embodiment and the second comparative example will be described below. FIG. 9 is a diagram showing for comparison time-depending changes of various values according to the present embodiment and the various values according to the second comparative example. In FIG. 9, the present embodiment is represented by solid-line curves and the second comparative example by dot-and-dash-line curves.

From time t0 to time t1 in FIG. 9, the FC vehicle 10 is cruising at a constant speed and the motor 14 is under a constant load (the load quantity Lf). Along therewith, in both of the present embodiment and the second comparative example, the target FC voltage Vfc_tar, the target FC current Ifc_tar, the rotational speed N of the air pump 36, and the battery current Ibat are constant.

At time t1, the driver of the FC vehicle 10 returns the accelerator pedal, not shown, to its original position, for example, quickly reducing the load quantity Lf. According to the second comparative example, the FC 32 is prevented from being deteriorated. On the other hand, the output sound of the air pump 36 tends to make the user feel uncomfortable, the fuel economy is likely to be lowered, and the battery 20 is liable to be deteriorated due to an increase in the load imposed thereon.

According to the present embodiment, even when the load quantity Lf is quickly reduced at time t1, since the target FC voltage Vfc_tar (the target secondary voltage V2_tar) is slowly increased, the FC 32 is prevented from being deteriorated. Furthermore, the output of the air pump 36 is mainly determined based on the requested air flow rate FR_req. The requested air flow rate FR_req corresponds to the requested FC current Ifc_req before the rate limiting control process is carried out. Consequently, when the load quantity Lf is quickly reduced at time t1, the rotational speed N of the air pump 36 is also quickly reduced, rather than being relatively slowly reduced as is the case with the second comparative example. The user is thus less likely to feel uncomfortable about the output sound of the air pump 36 unlike the second comparative example.

According to the present embodiment, furthermore, the regulator 50 operates to lower the amounts of hydrogen and oxygen supplied to the FC 32 when the rotational speed N of the air pump 36 is lowered. Therefore, when the rotational speed N of the air pump 36 is quickly reduced, the amounts of hydrogen and oxygen supplied to the FC 32 are also quickly reduced. As a result, the output of the FC 32 is more greatly reduced than with the second comparative example, reducing the FC current Ifc flowing from the FC 32 into the battery 20. The FC 32 thus does not produce an unnecessary FC current Ifc, resulting in an increase in the fuel economy and preventing the battery 20 from being deteriorated due to an increase in the load imposed thereon.

4. Advantages of the Present Embodiment

According to the present embodiment, as described above, when the fuel cell allocated load Lf corresponding to the electric power required by the motor 14 is lowered, the FC 32 is prevented from being deteriorated by the rate limiting control process, and the user is prevented from feeling uncomfortable about the output sound of the air pump 36 during the rate limiting control process.

Specifically, in the rate limiting control process, since an increase of the FC voltage Vfc is limited, the FC electric power Pfc is more slowly reduced than the load quantity Lf is lowered, thereby preventing the FC 32 from being deteriorated. In the rate limiting control process, if the rotational speed N of the air pump 36 is associated with the target FC current Ifc_tar (FC electric power Pfc), then even when the load quantity Lf is lowered, the rotational speed N of the air pump 36 is not reduced significantly, tending to make the user feel uncomfortable about the output sound of the air pump 36. According to the present embodiment, in the rate limiting control process, since the rotational speed N of the air pump 36 is associated with the load quantity Lf, when the load quantity Lf is reduced, the rotational speed N of the air pump 36 is lowered accordingly. Therefore, the user is prevented from feeling uncomfortable about the output sound of the air pump 36.

According to the present embodiment, moreover, excessive electric power generated by the FC 32 in the rate limiting control process is supplied to charge the battery 20. Consequently, the battery 20 is prevented from being deteriorated when it is charged in the rate limiting control process.

Specifically, in the rate limiting control process, if the rotational speed N of the air pump 36 is associated with the FC electric power Pfc, then even when the load quantity Lf is lowered, the rotational speed N of the air pump 36 is not reduced significantly, but the FC 32 is supplied with amounts of oxygen-containing gas and hydrogen which are greater than those corresponding to the load quantity Lf. At this time, the FC electric power Pfc exceeds the load quantity Lf, and the battery 20 is quickly charged with excessive electric power. Thus, the battery 20 tends to be unduly deteriorated.

According to the present embodiment, in the rate limiting control process, the rotational speed N of the air pump 36 is associated with the load quantity Lf. Therefore, when the load quantity Lf is lowered, the rotational speed N of the air pump 36 is also lowered accordingly. The FC 32 is thus supplied with only amounts of oxygen-containing gas and hydrogen which correspond to the load quantity Lf. As excessive electric power produced by the FC 32 in the rate limiting control process is reduced, the battery 20 is prevented from being deteriorated due to quick charging with excessive electric power.

According to the present embodiment, the rotational speed N of the air pump 36 is controlled based on the requested FC current Ifc_req rather than the target FC current Ifc_tar. Therefore, the rate limiting control process does not affect the output of the air pump 36, and hence the output sound of the air pump 36 is appropriately controlled.

5. Modifications

The present invention is not limited to the above embodiment. Rather, various changes and modifications may be made in the embodiment based on the contents of the above description. For example, the following changes and modifications may be employed.

In the above embodiment, the FC system 12 is incorporated on the FC vehicle 10. However, the FC system 12 may be incorporated in other mobile objects such as a ship, an aircraft, etc., or may be applied to a home electric power system.

In the above embodiment, the regulator 50 whose opening is determined depending on the pressure of air is used to control the flow rate of hydrogen. However, any of various other mechanisms such as a valve controlled by an electric signal from the ECU 24 may be used to control the flow rate of hydrogen.

In the above embodiment, the electric power distributor 22 includes the DC/DC converter 80 connected between the battery 20, the motor 14, and the FC 32. However, the electric power distributor 22 may include a boosting DC/DC converter connected between the FC 32 and the motor 14.

In the above embodiment, the DC/DC converter 80 has one upper arm switching element 82 and one lower arm switching element 83. However, the DC/DC converter 80 may have two or more upper arm switching elements 82 and two or more lower arm switching elements 83.

In the above embodiment, the FC electric power Pfc is controlled by controlling the secondary voltage V2 or the FC voltage Vfc. However, the output of each of the cells of the FC 32 may be controlled by controlling the cell voltage Vcell of each of the cells of the FC 32.

In the above embodiment, the FC electric power Pfc is limited by imposing a limitation on the change (voltage change $\Delta Vfc$) per unit time in the FC voltage Vfc in the rate limiting control process. However, the FC electric power Pfc may be lowered so as to reduce the frequency at which the FC voltage Vfc becomes equal to or higher than a predetermined voltage when the load quantity Lf which is representative of the electric power requested by the motor 14 is lowered. The predetermined voltage refers to the FC voltage Vfc at the time the cell voltage Vcell is 0.7 V as disclosed in Japanese Laid-Open Patent Publication No. 2009-032418, for example.

In the above embodiment, the excessive electric power produced by the FC 32 in the rate limiting control process is supplied to charge the battery 20. However, the excessive electric power may be consumed in other ways. For example, the excessive electric power may be supplied to an accessory such as an audio device, a navigation device, or the like, or a discharging circuit, not shown.

In FIG. 5, if the state of charge SOC of the battery 20 exceeds the threshold value TH_soc (S11: NO), or if the output of the DC/DC converter 80 is being limited (S13: YES), or if the cell voltage Vcell is abnormal (S14: YES), or if the requested FC current Ifc_req (present) is not smaller than the target FC current Ifc_tar (previous) (S15: NO), then a reduction in the output of the FC 32 is not limited using the subtractive current quantity Dis. Any of the above conditional branches may not be used or may be selectively used. Rather than not limiting a reduction in the output of the FC 32 using the subtractive current quantity Dis, the subtractive current quantity Dis may be increased.

In FIG. 5, the subtractive current quantity Dis is determined in step S16 after the requested FC current Ifc_req (present) and the target FC current Ifc_tar (previous) are compared with each other in step S15. Instead, step S16 may be carried out before step S15. In this case, the ECU 24 may determine in step S15 whether the requested FC current Ifc_req (present) is smaller than the difference between the target FC current Ifc_tar (previous) and the subtractive current quantity Dis (present) {Ifc_req (present)<Ifc_tar (previous)−Dis (present)} or not. This makes it possible to give finer settings to the target FC current Ifc_tar (present) when the difference between target FC current Ifc_tar (previous) and requested FC current Ifc_req (present) is smaller than the subtractive current quantity Dis.

What is claimed is:

1. A method of controlling a fuel cell vehicle having a load energizable by electric power generated by a fuel cell from hydrogen supplied from a hydrogen storage device and an oxygen-containing gas supplied from an air pump, comprising the steps of:
    performing a rate limiting control process for reducing the electric power generated by the fuel cell to reduce a frequency at which a voltage generated by the fuel cell is equal to or higher than a predetermined voltage when electric power requested by the load is lowered, wherein, during the rate limiting control process:
        an increase in the voltage generated by the fuel cell is limited, and
        an allowable reduction in an output of the fuel cell is made smaller as the output of the fuel cell is smaller,
    changing a rotational speed of the air pump in correspondence with the electric power requested by the load, and
    charging an electric energy storage with excessive electric power produced by the fuel cell in the rate limiting control process.

2. A method according to claim 1, further comprising the step of making an allowable reduction in an output of the fuel cell smaller as the fuel cell is more deteriorated, in the rate limiting control process.

3. A method according to claim 1, wherein the fuel cell vehicle includes an electric energy storage connected to the load parallel to the fuel cell, the method further comprising the steps of:
    setting a threshold value for determining whether the electric energy storage is excessively charged or not; and
    performing the rate limiting control process when a remaining charged level of the electric energy storage is equal to or smaller than the threshold value.

4. A method according to claim 1, further comprising the step of performing the rate limiting control process when a cell voltage of the fuel cell is normal.

5. A method according to claim 1, further comprising the step of performing the rate limiting control process when a current generated by the fuel cell is reduced.

6. A method according to claim 1, further comprising the steps of:
    setting a requested current to be generated by the fuel cell based on the electric power requested by the load and controlling a current generated by the fuel cell using a target generated current which limits the requested current to be generated by the fuel cell to prevent the voltage generated by the fuel cell from becoming equal to or higher than a predetermined voltage, in the rate limiting control process; and
    controlling the rotational speed of the air pump based on the requested current to be generated by the fuel cell when the rate limiting control process is performed.

7. A method according to claim 1, wherein the load includes a traction motor for propelling the fuel cell vehicle, the fuel cell and the electric energy storage are connected to the motor in parallel relationship to each other, the electric energy storage includes a DC/DC converter, the method further comprises the step of controlling an output of the fuel cell by controlling the voltage generated by the fuel cell with the DC/DC converter.

8. A method according to claim 7, further comprising the steps of setting a requested current to be generated by the fuel cell based on the electric power requested by the load and controlling the DC/DC converter using, as a target value, a target generated current which limits the requested current to be generated by the fuel cell to prevent the voltage generated by the fuel cell from becoming equal to or higher than a predetermined voltage, in the rate limiting control process.

9. The method of claim 1, wherein the rotational speed of the air pump is changed when the electric power generated by the fuel cell is reduced.

* * * * *